(12) United States Patent
Mitsuzono et al.

(10) Patent No.: US 6,447,224 B2
(45) Date of Patent: Sep. 10, 2002

(54) MACHINE TOOL WITH PIVOTAL SPINDLE HEAD

(75) Inventors: Masaaki Mitsuzono, Numazu; Hideki Hayashi, Gotemba; Kazuo Nagashima, Shizuoka-ken, all of (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/800,484

(22) Filed: Mar. 8, 2001

(30) Foreign Application Priority Data

Mar. 9, 2000 (JP) ........................................ 2000-064566

(51) Int. Cl.$^7$ ................................................. B23C 1/12

(52) U.S. Cl. ........................ 409/201; 409/211; 409/216

(58) Field of Search ................................ 409/201, 211, 409/216, 202, 212; 29/40, 39, 26 A

(56) References Cited

U.S. PATENT DOCUMENTS

| | | | | | |
|---|---|---|---|---|---|
| 1,659,462 A | * | 2/1928 | Curtis | ........................ | 409/216 |
| 4,658,485 A | * | 4/1987 | Yang | ........................... | 29/26 A |
| 5,014,542 A | * | 5/1991 | Corsi | ........................ | 901/19 X |
| 5,248,074 A | * | 9/1993 | Speller, Sr. et al. | ... | 29/524.1 X |
| 5,839,862 A | * | 11/1998 | Hayashi et al. | ............. | 409/201 |

FOREIGN PATENT DOCUMENTS

FR 2428492 * 2/1980 ................. 409/201

* cited by examiner

Primary Examiner—William Briggs
(74) Attorney, Agent, or Firm—Finnegan, Henderson, Farabow, Garrett, & Dunner, L.L.P.

(57) ABSTRACT

A spindle head holder (5) is pivoted on a base member (1), a linear drive (21) is mounted to the base member (1), a linear guide (50) is mounted to the spindle head holder (5), and an engagement member (60) is engaged with both linear drive and linear guide at a substantially identical part (35, 37) thereof.

6 Claims, 3 Drawing Sheets

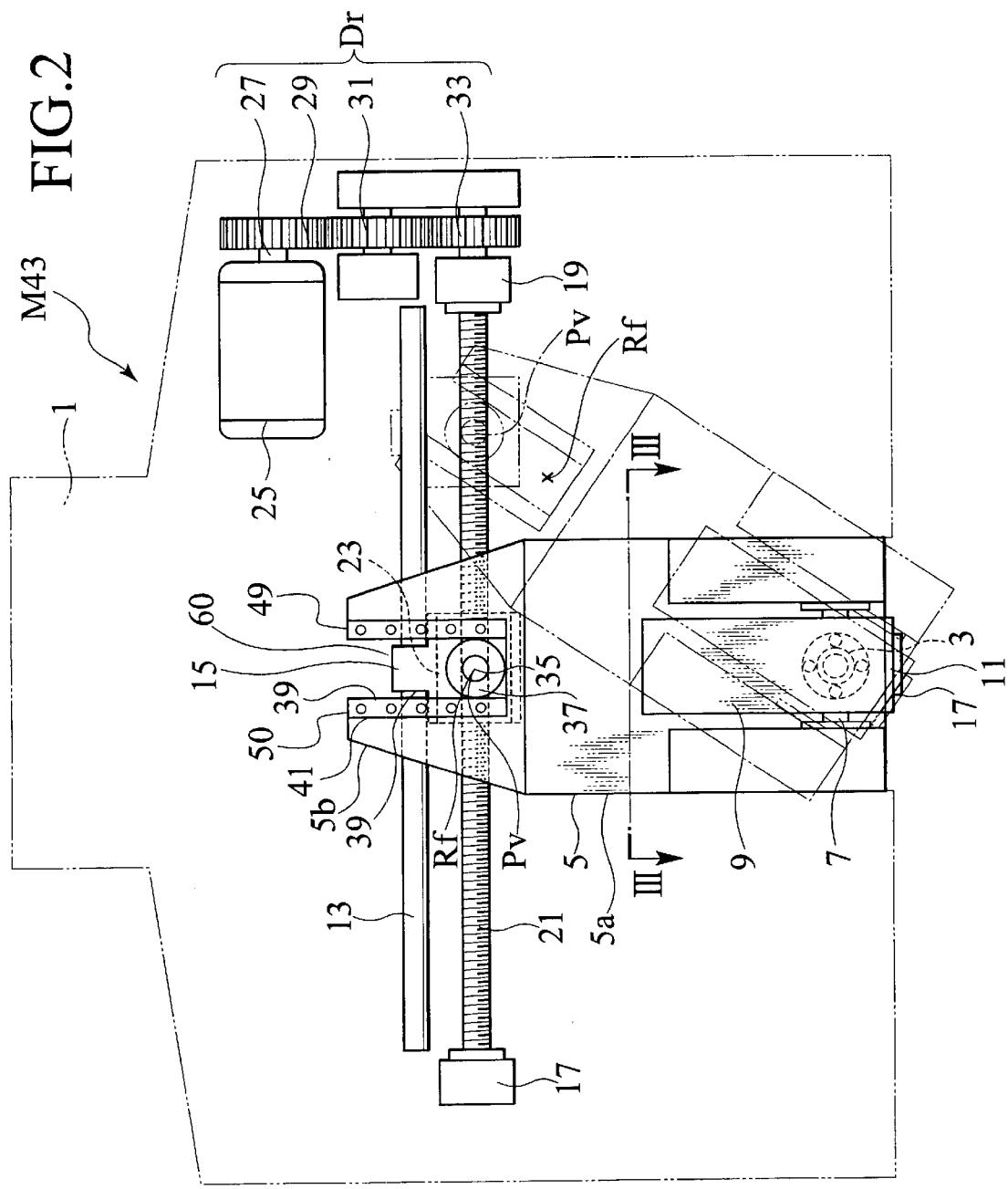

MACHINE TOOL WITH PIVOTAL SPINDLE HEAD

BACKGROUND OF THE INVENTION

1. Field of the Invention

The present invention relates to a machine tool with a pivotal spindle head, and particularly to a spindle head pivoting machine tool such as a multi-axis machining center.

2. Description of Relevant Art

Conventional machine tools of a spindle head pivoting type include a spindle head pivoting holder, which has a spindle head pivotally mounted thereto. Also the spindle head pivoting holder is pivotally mounted for rotation by a support shaft to a spindle head supporting base member that is constituted with ram, saddle, etc. to serve as a shaft carrier. The rotation of the spindle head pivoting holder is implemented by a gear train such as by a warm wheel mounted to the spindle head pivoting holder and a warm mounted to the spindle head supporting base member end, or by a sector gear mounted to the spindle head pivoting holder and a double pinion to the spindle head supporting base member end.

However, in arrangement having gears, such as warm wheel and warm or sector gear and double pinion, meshing with each other to rotate the spindle head pivoting holder, the structure is complicated, which constitutes a difficulty to increase the rigidity of a drive system because of the power transmission mechanism using gears.

As a solution to this problem, there has been disclosed in Japanese Patent Application Laid-Open Publication No. 10-43976 a spindle head pivoting mechanism in which a spindle head supporting base member (FIG. 5) has a lateral slider provided thereon to be driven by a feed screw in a lateral direction (L in FIG. 5), to a lateral position (x indicated by vertical line segments crossing the direction L in FIG. 5). The lateral slider has a vertical slider engaged therewith, which is movable for linear reciprocation (along a vertical line segment at the lateral position x) in the height direction of a chord of a rotation (at an angle θ about a center Ct of a circle A with a radius R). The spindle head supporting base member further has a support shaft (at the center Ct of the circle A), which supports a base end (at the center Ct) of a spindle head pivoting holder (as the radius R) to be rotatable thereabout. The spindle head pivoting holder is pivotally secured at a distal end thereof (as a point 'a' on the circle A) via an engagement piece to the vertical slider.

SUMMARY OF THE INVENTION

The lateral slider (the vertical line segment at the position x) is subjected to a great magnitude of moment (about a crossing point x between the line segment and the direction L) due to a load acting thereon at the distal end (the point 'a') of the spindle head pivoting holder, and needs to have a great rigidity and strength. Moreover, because $\theta = \sin^{-1}(x/R)$, the amount of lateral movement ($\Delta x_2$ per angular unit $\Delta\theta$) becomes smaller (than $\Delta x_1$), as the angle (θ) increases (from an upright position $\theta_1$ to a driven position $\theta_2$), and has a decreased feed precision.

The present invention is made with such points in view. It therefore is an object of the present invention to provide a machine tool with a pivotal spindle head free of consideration to undue moment. It also is an object of the present invention to provide a machine tool with a pivotal spindle head that has an increased lateral movement, as a rotation angle increases, and has an increased feed precision.

To achieve the object, according to an aspect of the invention, there is provided a machine tool with a pivotal spindle head, comprising a movable base member, a spindle head holder pivoted on the base member, a linear drive mounted to the base member, a linear guide mounted to the spindle head holder, and an engagement member engaged at a substantially identical part thereof with the linear drive and the linear guide.

According to the aspect of the invention, because the engagement member is engaged at the substantially identical part with both the linear drive and the linear guide, various forces acting on the engagement member from the drive and guide do not produce undue moment. Further, because the linear drive extends in a tangential direction of a circle to be described about a pivotal point of the spindle head holder, this holder has an increased linear movement, as a rotation angle increases, and has an increased feed precision.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 2 is a front elevation of the pivotal spindle unit and an associated guide mechanism;

DETAILED DESCRIPTION OF THE PREFERRED EMBODIMENTS

Figure 1:
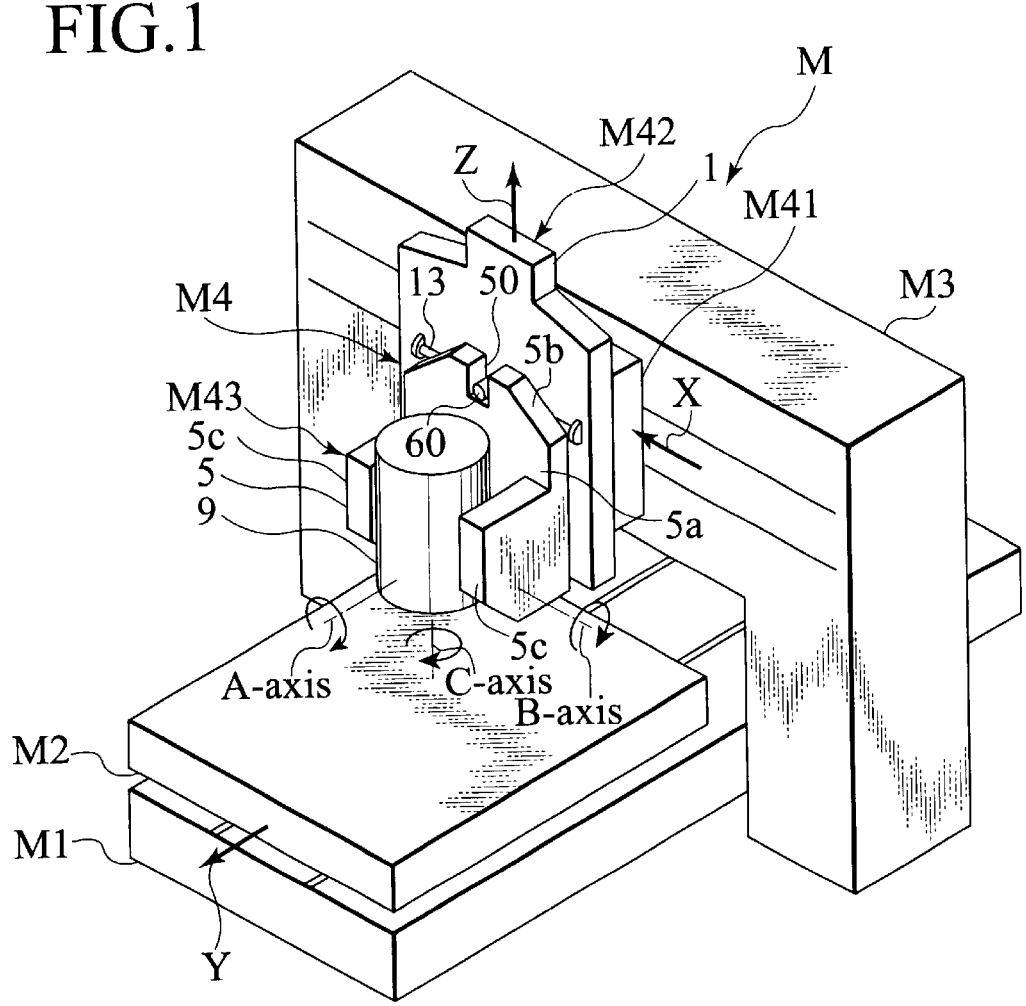
FIG. 1 is a schematic perspective view of a machine tool with a pivotal spindle unit according to an embodiment of the invention.

There will be detailed below a preferred embodiment of the present invention with reference to the accompanying drawings. Like members or elements are designated by like reference characters.

FIG. 1 shows a machine tool M according to an embodiment of the invention. The machine tool M includes a table base M1, a work table M2, a tool gate M3, and a spindle carrier M4.

The work table M2 is movably mounted on the table base M1, to be driven by an NC controlled drive (not shown) along guide rails on the base M1 in a Y direction. The tool gate M3 strides over the base M1. The spindle carrier M4 is movably mounted to the gate M3. This carrier M4 is made up by a carrier member M41 to be driven by an NC controlled drive (not shown) along guide rails on the gate M3 in an X direction, and a spindle supporting unit M42 movably mounted on the carrier member M41.

The spindle supporting unit M42 is constituted with a spindle supporting vertical base member 1 movably mounted on the carrier member M41, and a pivotal spindle unit M43 pivotally mounted on the base member 1. The base member 1 can be driven in a Z direction by an NC controlled drive (not shown), such as a ram or saddle on the carrier member M41.

Figure 3:
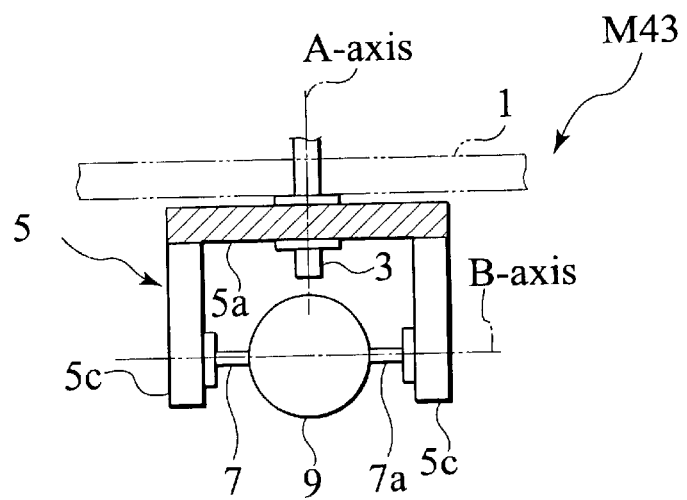
FIG. 3 is a schematic section along line III—III of FIG. 2.

FIG. 2 is a front view of the pivotal spindle unit M43, and FIG. 3 is a section along line III—III of FIG. 2. The pivotal spindle unit M43 is constituted with a pivot shaft 3 as an A-axis mounted to the base member 1, a U-shaped spindle head holder 5 pivoted near a lower end of a back main part 5a thereof on the pivot shaft 3 for rotation about the A-axis, another pivot shaft 7 as a B-axis mounted near lower ends of both side parts 5c of the spindle head holder 5, and a spindle head 9 pivotally mounted on the pivot shaft 7 for rotation about the B-axis.

The spindle head 9 is pivotally driven by an NC controlled drive (not shown) about the B axis, which drive may include part 7a of the shaft 7. The spindle head 9 has a downward spindle 11 inserted thereto, and an NC controlled built-in motor (not shown) for driving the spindle 11 to rotate about a C-axis.

The pivotal spindle unit M43 further includes a lateral linear guide 13 as a straight guide member mounted on the base member 1, a pivotal linear guide 50 mounted to a triangular top part 5b of the spindle head holder 5, a slider 60 as an engagement member engaged with the lateral and pivotal linear guides 13 and 50, and an NC controlled motor-driven drive Dr supported by the base member 1 for driving the slider 60 to move along the linear guides 13, 50.

Figure 4:
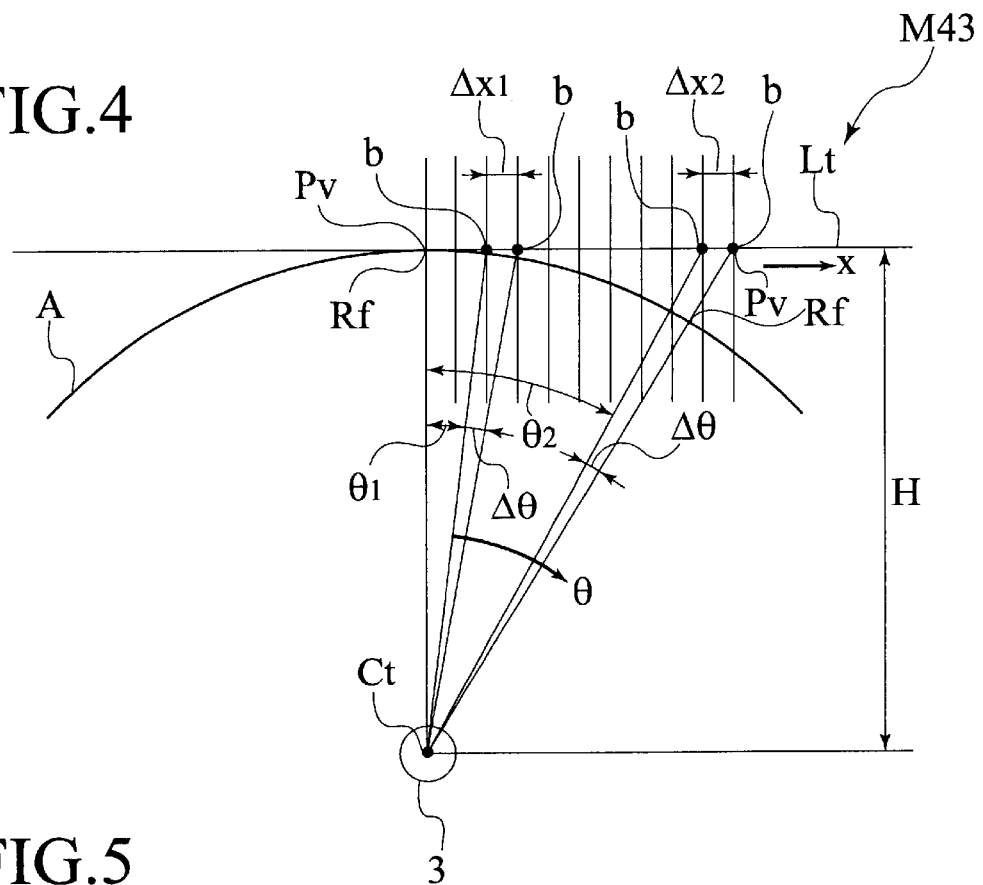
FIG. 4 is a diagram describing actions of a spindle head holder of the machine tool of FIG. 1.
Figure 5:
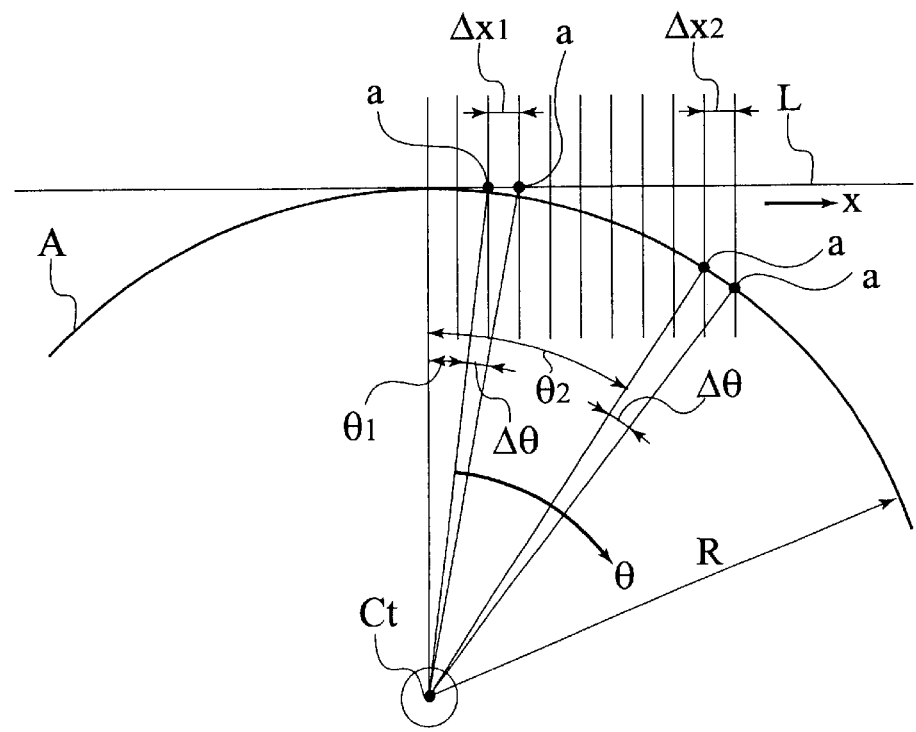
FIG. 5 is a diagram describing actions of a spindle head holder of a conventional machine tool.

The lateral linear guide 13 extends in a lateral or horizontal direction in FIG. 2, that is the direction of a chord of a circle A (FIG. 4). This circle A is described by a reference point Rf of the pivotal linear guide 50 about a center Ct of the pivot shaft 3, as the spindle head holder 5 rotates about the A-axis.

The slider 60 is integrally constituted with a lateral slider 15, a feed nut 23, a shaft part 35 of which the center (as a pivotal point Pv) coincides with the reference point Rf when the spindle head holder 5 is in an upright position, and an annular engagement piece 37 rotatably mounted on and centered to the shaft part 35. The lateral slider 15 is linearly reciprocally movably engaged with the lateral linear guide 13.

The drive Dr is constituted with an NC controlled servo motor 25 mounted on the base member 1, a drive wheel 29 mounted on an output shaft 27 of the servo motor 25, and a driven gear 33 driven by the drive gear 25 via an intermediate gear 31. The drive Dr further includes a ball screw 21 as a lateral or horizontal linear feeder supported at both ends by bearings 17 and 19. The ball screw 21 is parallel to the lateral linear guide 13, that is, to a linear reciprocal direction of the lateral slider 15.

The ball screw 21 is driven for rotation by the gear 33. The ball nut 23 (as integral part of the slider 60) is meshed with the ball screw 21. Therefore, when the ball screw 21 is rotated, the lateral slider 15 (as part of the slider 60) is linearly fed in the lateral direction, that is, in the direction of a chord of the circle A (FIG. 4). The shaft part 35 of the slider 60 is formed as part of the lateral slider 15, and centered to the pivotal point Pv, which coincides with a centerline of the ball screw 21 when the slider 60 moves.

The pivotal linear guide 50 is made by a pair of straight guide members 41, 49 fixed (to be flush) to both lateral sides of a linear groove 39, which is formed in the top part 5b of the spindle head holder 5 in the height direction of a chord of the circle A (FIG. 4). The engagement piece 37 (as part of the slider 60) is dimensioned so as to roll and/or slide between the guide members 41, 49 for linear displacement along the linear groove 39.

FIG. 4 is a diagram describing actions of the spindle head holder M43.

As the ball screw 21 is driven to rotate by the servo motor 25 via the gears 29, 31, and 33, the lateral slider 15 is fed to be linearly guided by the linear guide 13 in the lateral direction (the direction of a chord of the circle A, that is parallel to a tangential line Lt of the circle A in the upright position of the spindle head holder 5, where the reference and pivotal points Rf and Pv coincides with each other). Along with such lateral movements of the lateral slider 15, the engagement piece 37 is linearly fed (to points 'b') along the centerline of the feed screw 21. It is noted that each point 'b' coincides with the pivotal point Pv between the spindle head holder 5 and the slider 60 including the lateral slider 15.

Concurrently, the engagement piece 37 is displaced in a linear direction of the linear groove 39 so that, as indicated by imaginary lines in FIG. 2, the spindle head holder 5 rotates about the center Ct of the pivot shaft 3, and the spindle head 9 is rotated about the same center Ct together with the holder 5.

Therefore, when the pivotal point Pv is moved to a point x (as a displacement of the shaft part 35 or the lateral slider 15 along the tangential line Lt as a feed axis), the spindle head holder 5 is rotated about the center Ct at an angle θ relative to the upright position of the holder 5 such that θ=tan$^{-1}$ (x/H), where H is a distance between the tangential line Lt and a diameter of the circle A parallel thereto, that is a radius of the circle A. Accordingly, for a unit angle Δθ of rotation of the spindle head holder 5, the lateral slider 15 has an increasing change Δx of displacement x, as the rotation angle θ increases within a range under 90 degrees. In other words, a commensurate change $Δx_2$ of displacement x per unit angle Δθ at an angle $θ_2$ is greater than that $Δx_1$ at an angle $θ_1$, if $θ_2>θ_1$. This is contrary to the before-mentioned conventional case. As a result, the feed screw 21 is allowed to make a high precision control in revolution.

Further, while the nut 23 is fed by the linear feed screw 21, the pivotal point Pv between the spindle head holder 5 (or more specifically the pivotal linear guide 50) and the slider 60 is coincident with the centerline of the feed screw 21, the slider 60 is kept from undue moment about the center Ct of the shaft part 35. Therefore, associated arrangement can be simplified or light-weighted, and the motor 27 is allowed to have a reduced capacity.

According to the embodiment, an NC machine tool M with a pivotal spindle head 9 comprises a spindle head supporting base member 1, a spindle head pivotal holder 5, a lateral slider 15, a linear drive means (21, etc.), a engagement piece 37, and a linear groove 39. The pivotal holder 5 has a spindle head 11 mounted thereto. The pivotal holder 5 is mounted by a support shaft 3 to the base member 1, to be pivotally movable about the support shaft 3. The lateral slider 15 is provided on the base member 1, and movable for linear reciprocation in a direction of a chord of a circle to be described by a top or distal part 5b of the pivotal holder 5, as it is pivotally moved. The linear drive means is configured to linearly drive the lateral slider 15 in a direction of reciprocal linear movement. The engagement piece 37 is fixedly disposed at a point on a straight line parallel to the lateral slider 15. The linear groove 39 is formed in the pivotal holder 5 in a height direction of the chord. The engagement piece 37 is engaged in the linear groove 39 and configured to be displaced in a linear direction of the linear groove 39.

Accordingly, by a linear movement of the lateral slider 15 in a direction of the chord, the engagement piece 37 is caused to straight-linearly move and to be concurrently displaced in the linear direction of the linear groove 39, and the pivotal holder 5 is caused to rotate about the support shaft 3. Therefore, there is not caused the conventional defect in which the precision of a rotation angle of a spindle head pivotal holder becomes worse, as the rotation angle of the pivotal holder increases. As a result, there can be achieved a high precision of rotation control even in a rotation angle control such as of a feed screw for a lateral slider to be thereby fed laterally.

Further, according to the embodiment, the linear drive means comprises a feed screw mechanism constituted with a feed screw 21 rotatably mounted to the spindle head supporting base member 1, a feed nut 23 mounted to the lateral slider 15 and screwed on the feed screw 23, and an electric motor 25 installed on the spindle head supporting base member 1 and configured to drive the feed screw 21 to rotate.

Accordingly, the feed screw 21 is driven for rotation by the electric motor 25, and the lateral slider 15 is thereby caused to straight-linearly move in the direction of the chord together with the feed nut 23. Therefore, it can be achieved with a simplified structure for the lateral slider 15 to be moved in a direction of a chord with a high precision. Further, the precision of a rotation angle of a spindle head pivotal holder (and hence of a spindle head) can be maintained high by the rotation angle control of feed screw.

While preferred embodiments of the present invention have been described using specific terms, such description is for illustrative purposes, and it is to be understood that changes and variations may be made without departing from the spirit or scope of the following claims.

What is claimed is:

1. A machine tool with a pivotal spindle head, comprising:
   a movable base member;
   a spindle head holder pivoted on the base member;
   a linear drive mounted to the base member and configured to swing the spindle head holder for describing a circular arc with respect to a pivot point in the base member;
   a first linear guide mounted to the spindle head holder for guiding a slider reciprocally in a direction perpendicular to the circular arc; and
   the slider engaging both the linear drive and the first linear guide, such that the slider reciprocates with respect to the spindle head holder in the direction perpendicular to the circular arc while the spindle head holder swings along the circular arc.

2. A machine tool according to claim 1, further comprising a second linear guide mounted to the base member for guiding the slider reciprocally along the linear drive.

3. A machine tool according to claim 1, further comprising a pivot shaft mounted to the base member to pivotally move the spindle head holder in a plane parallel to the linear drive and the first and second linear guides.

4. A machine tool according to claim 3, further comprising a spindle head pivoted on the spindle head holder and pivotally movable in a crossing direction to the plane.

5. A machine tool according to claim 1, wherein the first linear guide comprises a pair of guide members, each fixedly attached to each lateral side of a linear groove formed in upper portion of the spindle head holder.

6. A machine tool according to claim 5, wherein the slider further comprises an engagement piece configured to slide between the pair of guide members for displacement along the linear groove.

* * * * *

UNITED STATES PATENT AND TRADEMARK OFFICE
CERTIFICATE OF CORRECTION

PATENT NO.    : 6,447,224 B2
DATED         : September 10, 2002
INVENTOR(S)   : Masaaki Mitsuzono et al.

It is certified that error appears in the above-identified patent and that said Letters Patent is hereby corrected as shown below:

<u>Title page,</u>
Item [73], Assignee, "Yazaki Corporation" should read -- Toshiba Kikai Kabushiki Kaisha --.

Signed and Sealed this

Twenty-fourth Day of December, 2002

JAMES E. ROGAN
*Director of the United States Patent and Trademark Office*